United States Patent Office 3,803,256
Patented Apr. 9, 1974

3,803,256
PROCESS FOR PRODUCING GASOLINE
BLENDING COMPONENTS
Francis William Kirsch, Wayne, David S. Barmby, Media, and John D. Potts, Springfield, Pa., assignors to Sun Oil Company of Pennsylvania, Philadelphia, Pa.
No Drawing. Continuation-in-part of abandoned application Ser. No. 840,110, June 16, 1969. This application Feb. 9, 1971, Ser. No. 114,061
Int. Cl. C07c 3/02
U.S. Cl. 260—673.5                 16 Claims

ABSTRACT OF THE DISCLOSURE

Normally liquid olefins (such as can be obtained by contacting normally gaseous olefins with an acidic aluminosilicate zeolite catalyst) can be converted to a mixture of aromatic and paraffinic hydrocarbons by contacting the normally liquid olefin at 650°–1150° F., 1 to 200 atmospheres, with a solid catalyst comprising at least one Group VI metal or a sulfide or oxide of a Group VI metal (e.g., chromia on an alumina support). The reaction mixture is useful as a gasoline blending component.

CROSS REFERENCES TO RELATED APPLICATIONS

The present application is a continuation-in-part of all of the following copending applications of the present inventors, Francis William Kirsch, David S. Barmby and John D. Potts, all of these being assigned to the Sun Oil Company.

| Serial number | Filing date | Title |
| --- | --- | --- |
| 581,129, now abandoned | 8-25-66 | Process for paraffin-olefin alkylation. |
| 715,998, now U.S. 3,624,173, issued Nov. 30, 1971. | 3-26-68 | Gd zeolite and hydrocarbon conversion process with Gd zeolite catalyst. |
| 716,190 | 3-26-68 | Process for paraffin-olefin alkylation. |
| 749,714, now abandoned | 8-2-68 | Dy zeolite and hydrocarbon conversion process with Dy zeolite catalyst. |
| 823,656, now U.S. 3,655,813, issued Apr. 11, 1972. | 5-12-69 | Paraffin-olefin alkylate composition. |
| 830,687 | 6-5-69 | Continuous alkylation process. |
| 840,110, now abandoned | 6-16-69 | Process for producing gasoline blending components. |
| 34,209, now U.S. 3,706,814, issued Dec. 19, 1972. | 5-4-70 | Continuous process for producing gasoline blending components. |

The disclosure of all of the above-cited copending applications is hereby incorporated in the present invention.

In particular, normally liquid olefins (including hydrocarbon mixtures containing such olefins) which can be converted to a mixture of aromatics and paraffins, in a preferred embodiment of the present invention, can be obtained by catalytic conversion processes disclosed in the above-cited copending applications. The said copending applications also disclose catalysts which can be used in catalytic processes, such as polymerization of normally gaseous monolefins, by means of which feeds rich in liquid olefins can be obtained. Catalysts described in said copending applications, such as the substantially anhydrous acidic crystalline alumina-silicate zeolites which contain cations of a Group VI metal, can also be used in effecting the conversion of normally liquid olefins to aromatics and paraffins. Other useful catalysts are those described in application Ser. No. 715,994 of Alfred E. Hirschler, filed Mar. 26, 1968, and entitled "Hydrocarbon Conversion Process with Gd Catalyst," now U.S. Pat. 3,541,001 issued Nov. 17, 1970, and in application Ser. No. 749,932 of Ronald D. Bushick and Alfred E. Hirschler, filed Aug. 5, 1968, and entitled "Alumino-Silicate Catalyzed Reactions of Polycyclic Aromatic Hydrocarbons in the Presence of Hydrogen," now U.S. Pat. 3,565,964 issued Feb. 23, 1971, and in U.S. Pat. No. 3,396,203, issued Aug. 6, 1968, and applications Ser. No. 718,980, filed Mar. 26, 1968, entitled "Combination of Gd Alumino-Silicate and Hydrogenation Catalyst," now U.S. Pat. 3,534,114 issued Oct. 13, 1970; Ser. No. 749,739, filed Aug. 2, 1968, entitled "Combination of Dy Alumino-Silicate Catalyst and Hydrogenation Catalyst," now U.S. Pat. 3,534,115 issued Oct. 13, 1970, and Ser. No. 750,432, filed Aug. 2, 1968, entitled "Process for Producing Sym-Octahydroanthracene and Sym-Octahydrophenanthrene" of Ronald D. Bushick, now U.S. Pat. No. 3,715,406, said Ser. No. 28,608, filed Apr. 15, 1970, of Alfred E. Hirschler, now U.S. Pat. 3,610,711, and Ser. No. 28,942, filed Apr. 15, 1970, of Alfred E. Hirschler and Gary L. Driscoll, all of which are assigned to the Sun Oil Company. Said Ser. Nos. 28,608 and 28,942 also disclose $C_{5+}$ olefins which can be used as a feed to the present process. The disclosure of all of the above-cited applications and patents is hereby incorporated herein by reference.

The processes disclosed in the said patent applications for activation, hydration and regeneration of "aged" zeolite catalysts can also be useful in practice of the present process particularly for regeneration of "aged" catalyts which have been used to convert normally liquid olefins to a mixture of aromatic and paraffinic hydrocarbons.

RELEVANT PRIOR ART

In the prosecution of parent application Ser. No. 840,110, now abandoned, the following patents were cited:

| Patent No. | Patentee |
| --- | --- |
| 2,378,057 | Yarnall. |
| 2,971,903 | Kimberlin et al. |
| 2,972,643 | Kimberlin et al. |
| 2,992,283 | Eng. |
| 3,236,910 | Bukata et al. |
| 3,364,135 | Hansford. |

SUMMARY OF THE INVENTION

This invention relates to the production of normally liquid hydrocarbons, useful in gasoline blending, by reacting acyclic olefins in the presence of a solid catalyst. A preferred class of solid catalyst consists of substantially anhydrous crystalline alumino-silicate zeolites. These zeolites, in hydrated form, are chemically characterized by the empirical formula $xM.x(AlO_2).y(SiO_2).zH_2O$ wherein M is H+ and/or an equivalent valence of metal cations and $x$, $y$ and $z$ are integers, the ratio $x/y$ being usually from 1.0 to 0.2. For aromatization of olefins, M preferably, in one embodiment, consists of one or more cations of a Group VI metal. Halide catalyst adjuvants can also be used (but are not necessary) to increase the degree of conversion of olefins and paraffins to upgraded hydrocarbons (e.g., hydrocarbons which are more preferred as gasoline components).

Conventional "polymer" gasoline (e.g., propylene trimer) is an especially useful feed in the present process.

In our application Ser. No. 581,129, we disclosed that $C_{5+}$ olefins, such as those obtained when contacting $C_4$–$C_6$ olefin and $C_3$–$C_6$ paraffin with an acidic crystalline zeolite catalyst, can be converted to a high octane motor fuel by the following reaction:

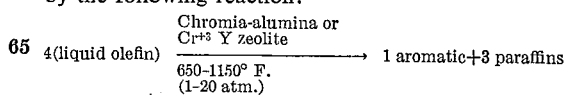

$$4(\text{liquid olefin}) \xrightarrow[\substack{650-1150°\text{ F.} \\ (1-20\text{ atm.})}]{\substack{\text{Chromia-alumina or} \\ \text{Cr}^{+3}\text{ Y zeolite}}} 1 \text{ aromatic} + 3 \text{ paraffins}$$

As is apparent from the specification in said Ser. No. 581,129, two methods of preparing $Cr^{+3}$ Y zeolite are to exchange NaY zeolite directly with a solution containing ammonium ions (thus reducing the sodium content of the zeolite) and then to exchange the resulting ammonium-exchanged zeolite with cations of $Cr^{III}$. In this latter process, the sequence can be reversed (e.g., chromium exchange first, then ammonium exchange) or the ammonium and chromium cations can be present in the same exchange solution. In any event, the exchanged zeolite must be activated (as by heating) to remove most of its water content. Although the activated Y zeolite containing cations of $Cr^{III}$ has been indicated by the symbol $Cr^{+3}$ Y, the more precise symbol would be $Cr^{III}HNaY$, indicating that minor amounts of sodium can be retained in the zeolite and that electronic equivalency is maintained by "protonic" sites.

Heretofor, attempts to effect paraffin-olefin alkylation utilizing a solid catalyst have had but little success. In all such published attempts, the bromine numbers of the reported products have been high, indicating that olefin polymerization (or some other competing reaction) has occurred to a substantial extent rather than the hoped for paraffin-olefin alkylation. In general, such olefinic hydrocarbons are less desirable as gasoline components because they are gum formers, are sensitive to oxidation and have poorer motor octanes than the corresponding paraffin hydrocarbons. Aromatic and branched chain paraffins are generally good gasoline blending components with high octane ratings and are more desired in our process than are such olefins. For example, U.S. Pat. No. 2,326,585 reports products having bromine numbers from 25 to as high as about 70 from a process wherein isobutane and propylene are reacted in the presence of an alumina gel which is impregnated with molybdenum oxide. Such high bromine number products are rich in olefins which can be converted to paraffins and aromatics by contacting with $Cr^{+3}$ Y catalyst.

For example, U.S. Pat. No. 3,132,186 indicates that isobutylene dimers and trimers predominate in the liquid product when a commercial isobutylene stream is contacted with a crystalline zeolite catalyst at temperature between about 0° F. and 500° F. and pressures from subatmospheric to as high as about 100 p.s.i.g. Also illustrative of such olefin polymers is U.S. Pat. No. 3,155,741 which reports that a 5A molecular sieve catalyzed the 100% conversion of isobutylene to a polymer having an average molecular weight of 242.

In U.S. Pat. No. 3,251,902, claims are directed to the alkylation of $C_4$ and $C_5$ isoparaffins with $C_2$–$C_5$ olefins. However, with propylene and isobutane as the feed hydrocarbons, the reported products of the alkylation process of 3,251,902 are highly unsaturated, and, in fact, the inventors admit that such unsaturation indicates that "polymerization of the olefin is more pronounced than alkylation."

French Pat. 2,011,673, published Mar. 6, 1970, (based on U.S. Ser. No. 740,049 filed June 26, 1968 now U.S. Pat. No. 3,549,557) also shows how to make high bromine number (e.g. 13–64) "alkylate" which can be converted to a more desirable gasoline blending component by means of the present invention. The catalyst and alkylation process in said French patent have been disclosed to be operable (but not preferred) for alkylation in our parent applications (see especially Ser. No. 716,190).

In all of our previously cited applications (e.g. Ser. No. 581,129) we disclose a process for the production of highly saturated alkylate from monoolefins which requires not only a catalyst with a large number of acid sites of sufficient strength for hydride transfer but which also utilizes conditions which favor hydride transfer, such as introducing the olefin to the reactor in the liquid phase and in intimate admixture with $C_4$–$C_6$ isopraffin and controlling the addition of said olefin such that the unreacted olefin in the hydrocarbon-catalyst reaction mixture is maintained at less than 12 mole percent (preferably less than 7 mole percent) based on the unreacted $C_4$–$C_6$ isoparaffin. We have also disclosed (e.g. in Ser. No. 581,129 and 840,110 now abandoned) process conditions and catalysts which produce $C_{5+}$ olefins. These olefins, or feeds containing such olefins can be converted to paraffins and aromatics by our process, as by using $Cr^{+3}$ Y catalyst.

With such feed in our process we desire to lower the olefin content and maximize the production of saturated hydrocarbons and "high octane" aromatics.

In our previously cited applications we have further disclosed that in an alkylation process using a zeolite catalyst, the conversion of olefin to saturated products can be increased by the use of halide catalyst adjuvants. That is, the incorporation of small amounts of certain halides in the reaction mixture allows the production of as much as 100% more saturated hydrocarbons from the same quantity of olefin reactant than can be produced under the same reaction conditions in the absence of the halide adjuvant. Such halide-promoted reactions can also produce olefins, and such olefins or olefin-containing feeds can be upgraded by contacting at 650–1150° F. (ca. 340–620° C.) with $Cr^{+3}$ Y zeolite. Insuch a process any residual halide can be removed, or it can be permitted to remain in the feed to the $Cr^{+3}$ Y catalyst. A class of preferred catalyst for our process includes those substantially anhydrous, acidic 25–100% crystalline, alumino-silicate zeolites which, in hydrated form, are chemically characterized by the empirical formula

$$M_x(AlO_2)_x(SiO_2)_y \cdot (H_2O)_z$$

where M is $H^+$ and/or an equivalent valence of metal cations consisting essentially of $Cr^{+3}$ and $x$, $y$ and $z$ are integers, the ratio $x/y$ being usually from 0.65 to 0.35. A 10% aqueous suspension of the acidic zeolite catalyst will have a pH less than 7, preferably less than 5. For our process we prefer that the critical pore diameter of the zeolite be at least large enough to permit adsorption of benzene. We also prefer those acidic zeolites which contain both $H^+$ and polyvalent metal cations although catalysts having only cations of alkali metals and polyvalent metals (e.g., $Cr^{+3}NaY$) are effective in catalyzing conversion of olefins to aromatics and paraffins.

These catalysts are normally prepared from alkali metal containing zeolites (which in 10% aqueous suspension will have a pH greater than 7, and usually greater than 9) by ion-exchanging the alkali metal ions for $H^+$ and/or $Cr^{+3}$ cations (including such species as $(Cr^{III}OH)^{+2}$). Hydrogen-ion (or proton exchange can be effected by exchange from aqueous or non-aqueous medium with mineral acids, such as dilute aqeous HCl, or by exchange with solutions of acids and polyvalent metal ions (such as aqueous $HNO_3$ and $Cr(NO_3)_3$). Polyvalent metal exchange can be effected with solutions of salts of chromium such as chromium nitrate.

FURTHER DESCRIPTION AND EXAMPLES

The present invention may be further illustrated by the following examples. Examples I–V illustrate the preparation of acidic or potentially acidic solvated crystalline zeolites by aqueous cation-exchange. Example VI illustrates the "activation" of the solvated zeolites by removing "solvent" from the zeolite. The cerium-exchanged zeolites can be used to polymerize olefins and the chromium exchanged zeolites can be used to produce a high octane rating gasoline blending component from such olefin polymer (or from feeds containing "alkylate" and such olefin polymer). The remaining examples, excepting Example II illustrate the use of substantially anhydrous acidic crystalline alumino-silicate zeolites as catalysts to produce olefins or olefin containing feeds.

In particular, Example XI shows the highly unsaturated products which are obtained under certain process conditions when $C_4$–$C_9$ paraffins and $C_3$–$C_6$ feed olefins are contacted in the presence of a substantially anhydrous acidic zeolite (similar to that of Example III).

Example XII illustrates a preferred embodiment of the present invention wherein we produce an aromatic-containing gasoline which is useful as a component of blended fuel for high compression automobile engines.

EXAMPLE I

This example describes the ammonium-exchange of a crystalline, alkali metal alumino-silicate zeolite which can be heated to remove water and to decompose the ammonium-ion to produce a substantially anhydrous acidic crystalline alumino-silica zeolite which can be used as a catalyst for olefin polymerization. Preferably, before such decomposition or "decationizing," such ammonium exchanged zeolites are further exchanged with polyvalent metal cations, as is shown in Example III hereinafter. When the cation consists essentially of cations of $Cr^{III}$, the catalyst is useful for converting $C_{7+}$ olefin to aromatics and paraffins.

A kilogram of a commercially available hydrated crystalline alumino-silicate zeolite, identified as sodium zeolite Y, was dried in air at 125° C. for 18 hours, broken up into particles of 100 mesh or less, redried in air at 125° C. for 18 hours, and suspended with stirring, in 1.7 liters of a 9.1% by weight aqueous solution of ammonium chloride at 80° C. After 30 minutes the resulting ammonium-exchanged Y zeolite was separated from the liquid by filtration and recontacted at 80° C. in a similar manner with a second 1.7 liter portion of fresh $NH_4Cl$ solution. After 6 more such 30-minute exchange cycles, the filtered zeolite was washed with distilled water (pH 6.5) at 20° C. until no chloride ion could be detected in the spent wash liquid with acidic silver nitrate reagent.

The washed ammonium-exchanged zeolite was dried for about 18 hours in air at 125° C., then ground to about 200 mesh and stored. The dried ammonium-exchanged zeolite produced by the above series of eight ammonium-exchanges analyzed 1.34% Na and 4.6% N, and had a loss on ignition of 26.5%. After the first ammonium-exchange cycle, a similarly washed and dried portion of the zeolite analyzed 5.5% Na and 2.3% N, and had a loss on ignition of 25.6%.

The sodium Y zeolite before this ammonium-exchange had a pore-size sufficiently large to enable it to absorb benzene and analyzed 7.5% sodium and 8.86% aluminum, and had an Al/Si atomic ratio of 0.40. The sieve had a loss on ignition at 1800° F. of 23.8%. All ignition losses referred to hereinafter were run at 1800° F. The following table lists typical analytical data for the synthetic faujasite which is marketed as "Linde Type Y":

| Catalyst lot | A | B |
|---|---|---|
| Ignition loss [1] | 25.10 | 24.95 |
| Wt. percent (ignited basis): | | |
| $Na_2O$ | 8.98 | 9.06 |
| $Al_2O$ | 16.16 | 16.14 |
| $SiO_2$ | 47.11 | 47.68 |
| Molar ratio: | | |
| $Na_2O/Al_2O_3$ | 0.91 | 0.92 |
| $SiO_2/Al_2O_3$ | 4.95 | 5.01 |

[1] Dried at 125° C., then equilibrated in a desiccator for 16 hours at room temperature over 20 wt. percent $NaCl/H_2O$.

In a typical Y sieve, the sodium present in the structure should be stoichiometrically equivalent to the alumina on a molar basis in order to achieve electroneutrality. For example, the data above shows that a calculated $$Na_2O/Al_2O_3$$

ratio which is nearly equivalent to but less than one. This ratio also indicates that there is no excess sodium salt present. Since the $Na_2O/Al_2O_3$ ratio was not exactly one, it is apparent that protons were left in the structure after synthesis.

To prepare catalysts, NaY sodium is preferably about 70% or more exchanged with $NH_4+$ salts and then further cation-exchanged with a variety of polyvalent metal cations (e.g., rare earth salt solutions), dried, and activated before use. With typical $SiO_2/Al_2O_3$ ratios of approximately 5, a rare earth cation such as lanthanum can then be present at levels sufficient to satisfy the stoichiometric requirements imposed by the alumina tetrahedra in the low-sodium zeolite crystal lattice. Calculation of these levels shows a possible range of lanthanum from 0.6 to 13.5 wt. percent.

EXAMPLE II

This example illustrates the preparation of more highly ammonium-exchanged zeolites than that of Example I. Example I was repeated except that the sodium Y zeolite was subjected to 8 additional hot $NH_4Cl$ exchange cycles before it was washed chloride-free. The washed, dried, ammonium-exchanged zeolite, resulting from this total of 16 ammonium-exchange cycles, contained 0.77% sodium and 4.14% nitrogen, and had 29.8% loss on ignition.

A similar exchange for a total of 32 cycles produced washed, dried zeolite containing 0.21% Na and 4.64% N and having 28.7% loss on ignition.

Ammonium-exchange of alkali metal zeolites can also be accomplished by suspending the zeolite in a vessel containing the exchange solution and maintaining a flow of fresh exchange solution into the vessel while withdrawing an equal volume of catalyst-free liquid from the vessel. Removal of catalyst-free liquid from the vessel can be effected by forcing the liquid with pressure or suction through a pleated microporous, woven stainless steel screen "10 micron" filter. In such continuous flow processing, the flow rate is preferably regulated so as to maintain a relatively constant pH in the exchange vessel. Hydrochloric acid or nitric acid addition can also be used for pH control. With 10% ammonium chloride solutions it is preferred to maintain a pH of about 4.5 ±0.3 (at 80° C.). Ammonium exchange can also be effected by percolating the exchange solution through a fixed bed of zeolite.

EXAMPLE III

This example illustrates the further exchange of an ammonium-exchanged zeolite with a solution containing polyvalent metal ions in order to produce a zeolite containing both polyvalent metal ions and ammonium ions. A portion of the dried, ammonium-exchanged zeolite of Example I was contacted, with stirring, for 30 minutes at 80° C. with 1.7 parts by weight of a 1.3% solution of $Ce(NO_3)_3.6H_2O$, then separated from the exchange solution by filtration and recontacted for 30 minutes at 80° C. with 1.7 parts by weight of fresh cerium nitrate solution. After 6 more such exchange cycles (or a total of 8 exchanges), the filtered $Ce^{+3}$-exchanged/ammonium-exchanged zeolite was washed with water until no nitrate ion could be detected in the spent liquid by diphenylamine reagent. The washed $Ce-NH_4+Y$ zeolite was dried and stored in a moisture-tight container. The dried $Ce^{+3}-NH_4+$-exchanged zeolite analyzed 6.18% Ce, 1.25% Na, and 1.43% N. It had a 25.6% weight loss on ignition.

EXAMPLE IV

This example illustrates the use of additional cerium exchange cycles and a more highly ammonium-exchanged "base" zeolite in order to obtain zeolites with a greater cerium content and a lower sodium content than the zeolite of Example III. A portion of the washed, dried "16 cycle" $NH_4+$-exchanged zeolite of Example II was contacted according to the procedure of Example III for a total of 16 $Ce(NO_3)_3$-exchange cycles, then similarly washed and dried. The resulting $Ce^{+3}-NH_4+$-exchanged zeolite analyzed 10.1% Ce, 0.69% N, 0.68% Na, and had a loss on ignition of 24.4%.

A similar series of 16 cerium exchanges performed on the "32 cycle" ammonium-exchanged zeolite of Example II produced a washed, dried $Ce^{+3}-NH_4+$-exchanged zeolite which analyzed 0.23% Na, 10.3% Ce, 0.8% N, and had a loss on ignition of 24.7%.

If a chromium salt (e.g. $CrCl_3$ or $Cr(NO_3)_3$) is substituted for the cerium salt in Examples III and IV, halide-free, $Cr^{+3}$ Y zeolite containing less than 1% Na can be obtained.

EXAMPLE V

This example illustrates the preparation of a $Cr^{+3}$-exchanged sodium Y zeolite. A portion of the commercial sodium Y zeolite of Example I was ground and exchanged for 16 exchange cycles with $Cr(NO_3)_3$ solution in a manner similar to the exchange of Example III, then washed and dried. The resulting $Cr^{+3}$-exchanged Na Y zeolite contained about 2% sodium and contained no detectable halide ions.

The cerium or chromium exchanges of Examples III, IV, and this example can be effected in a continuous manner, similar to that described in Example II for ammonium-exchanges. Preferably, the pH should be about 4.5. The particular polyvalent metal salt chosen and the pH of the exchange solution will determine whether the cationic exchange species is the metal or a hydroxylated complex ion of the metal. Other polyvalent metal ions, such as those referred to hereinafter, and in particular cations of the polyvalent rare earth metals and mixtures thereof, may be similarly exchanged with alkali metal-containing and/or ammonium-containing crystalline zeolites. In this specification the term "rare earth metals" includes lanthanum.

EXAMPLE VI

This example illustrates the "activation" of hydrous crystalline alumino-silicate zeolites prior to their use as catalysts to polymerize olefins or to convert $C_7^+$ olefin to aromatics and paraffins. In general, hydrous crystalline zeolites are activated by controlled heating under vacuum or in a stream of a gas, such as air, hydrogen, nitrogen, or oxygen, to remove water. In the case of ammonium-exchanged zeolites, not only is water removed but also the ammonium is decomposed to obtain a substantially anhydrous, "decationized" or "protonated" zeolite. Such zeolites are highly acidic and are similar catalytically to those prepared by direct exchange with an aqueous acid.

When the hydrous ammonium zeolite also contains polyvalent metal ions, the resulting activated zeolite will be partially protonated or "cation deficient." Such zeolites are not only highly acidic, but are more resistant to the detrimental effects of the activation procedure.

The heating rate and temperatures of such "activation" will depend to a great extent on the type of zeolite, that is, the Al/Si atomic ratio, and the type and percent of polyvalent cations and monovalent ions such as hydrogen or ammonium ion. In any event the hydrated zeolite is first heated at a temperature sufficiently high to remove the bulk of the water from the pores of the zeolite. At atmospheric pressures this temperature is preferably from 125–300° C.

In the case of an ammonium-exchanged zeolite the temperature is then raised to a higher temperature than that used for water removal and such temperature is maintained for a sufficient time to remove a substantial amount of the ammonium ion from the zeolite $NH_3$. This removal may also involve decomposition of the ammonium by such reactions as oxidation of ammonia to nitrogen oxides or nitrogen and water.

At atmospheric pressure, with ammonium-exchanged zeolite which also contain appreciable quantities of exchanged polyvalent metal cations, this higher temperature is preferably 320–500° C. but can be as high as 600 or 650° C. if care is taken to control the activation so as to retain at least 25% of the crystallinity of the zeolite.

Our copending application Ser. No. 716,190 compares alkylation with crystalline zeolite catalysts containing polyvalent metals and which were activated at various temperatures (e.g., 400, 500 and 600° C.) and for varied periods of time. This data shows that these catalysts are all operative for alkylation. Analytical data is also presented which shows the reduction in OH groups (as residual $H_2O$) produced by such various activation procedures, particularly for temperatures in the range of 450–1292° F.

With ammonium-exchanged zeolites which contain no polyvalent metal cations or have a low content of polyvalent cations it is important that the activation temperature be kept below about 400° C., since at higher temperatures the intensity of the X-ray diffraction peaks of the zeolite decreases greatly (due to a degradation of crystalline structure) and the resulting catalyst is less active for paraffin-olefin alkylation. In U.S. Pat. 3,130,007, a similar intensity measurement is used to determine the "percent zeolite," and appears to relate to crystallinity of the zeolite.

We have also found that, if an ammonium-exchanged crystaline alkali metal zeolite is further exchanged with polyvalent metal cations, the resulting polyvalent metal-$NH_4^+$-exchanged zeolite retains a much greater proportion of its X-ray peak intensity after activation than does the base $NH_4^+$-exchanged zeolite. Although small quantities of polyvalent cations will be of some benefit in this respect, for our catalysts it is preferable that the zeolite contain at least the following quantity of polyvalent metal cations (or a combination thereof of equivalent valence):

(1) at least one tetravalent metal, metal oxide or metal hydroxide for every 16 atoms of aluminum in the alumino-silicate zeolite, or
(2) at least one trivalent metal, metal oxide or metal hydroxide for every 12 atoms of aluminum, or
(3) at least one divalent metal, metal oxide or metal hydroxide for every 8 atoms of aluminum.

The cation of our $Cr^{+3}$ zeolite catalyst is preferably selected from at least one of the following: $Cr^{+3}$, $CrOH^{+2}$, $Cr(OH)_2^{+1}$, $CrO^{+1}$. Also preferred is a catalyst which upon ignition analysis at 1800° F. evolves from 1–4 molecules of water for each atom of chromium in the zeolite.

As is discussed in greater detail in copending application Ser. No. 716,190, it is sometimes advantageous to control the activation such that the activated catalyst contains about ¼ to 2 mole of "bound water" for each atom of exchanged polyvalent metal (e.g. in a cerium Y zeolite alkylation catalyst, in the range of 0.8–1.2 molecules of water will be evolved for each atom of cerium, upon ignition at 1800° F.). It can also be advantageous in some cases to control the activation (see French Pat. 2,011,673) so that the activated zeolite catalyst contains less than about 60 percent of its maximum OH exhibiting infrared absorption in the region of 3480–3670 cm.$^{-1}$. This requirement can be fulfilled, for example, by utilizing the 600° F. activated catalysts described in our application Ser. No. 716,190.

Analcite, chabazite, phillipsite, and the Type Y zeolite of U.S. Pat. No. 3,130,007 have Al/Si ratios between 0.65 and 0.35 and are preferred zeolites for exchange with $Cr^{+3}$. Heulandite, mordenite and the Type L zeolite of U.S. Pat. No. 3,013,984 have Al/Si ratios less than 0.35, and are also useful catalysts when exchanged with $Cr^{+3}$.

As catalysts in our process we further prefer substantially anhydrous protonated alumino-silicates which are capable of adsorbing benzene, wherein the ratio Al/Si is from 0.65 to 0.35 and which contain at least one $Cr^{III}$ containing cation (e.g., $CrOH^{+2}$) for every 9 aluminum atoms, since such catalysts have high activity and retain a high degree of X-ray peak intensity on activation or regeneration.

For example, as an illustration of our preferred method of activation of a preferred species of hydrous zeolite, a 16-cycle $Cr^{+3}$-exchanged/16-cycle $NH_4$-exchanged zeolite, prepared by the teachings of Example IV, was heated at 230° C. in a rotating kiln in a stream of flowing air for about 1 hour to remove water. No loss of ammonium ions was detected during this heating period. The temperature of the kiln was then raised at the rate of about 10° C. per minute to a temperature of 400° C. During this heating, ammonia could be detected, by $MnSO_4AgNO_3$ reagent, in the exhaust gases from the kiln. The kiln was maintained at 400° C. for 2 hours, at which point no ammonia could be detected in the exhaust gases. The heat was then removed from the kiln and the kiln was cooled rapidly in a flowing stream of dry air. The activated catalyst was maintained overnight in a slowly flowing stream of dry air. The resulting, substantially anhydrous, protonated crystalline $Cr^{+3}$ Y alumino-silicate was transferred to a reactor.

EXAMPLE VII

This example illustrates the use of substantially anhydrous acidic crystalline alumino-silicate zeolite as a paraffin-olefin alkylation catalyst. The activated 16-cycle $Ce^{+3}$/16-cycle $NH_4^+$-exchanged zeolite of Example VII was charged in amount of 23.3 g. into a stirred autoclave. Then 444 milliliters of liquid isobutane was added. The stirring rate was adjusted such that substantially all of the zeolite was suspended in the liquid isobutane (about 550 r.p.m.). The temperature in the reactor was raised to 120° C. using sufficient nitrogen pressure (475 p.s.i.g.) to retain the liquid phase, when a liquid mixture of 1 part by volume of butene-2 and 5 volumes of isobutane was charged from a Jerguson gauge into the isobutane-catalyst slurry at the rate of 1 milliliter of mixture per minute for a period of 220 minutes. Reactants were maintained in liquid phase by nitrogen pressure. At the end of this time the reaction was stopped by cooling the reactor to 17° C., then separating the reaction mixture from the catalyst by first removing the normally gaseous hydrocarbons at room temperature and atmospheric pressure, and then separating the liquid product from the catalyst by filtration. The used catalsyt analyzed 0.9% coke (non-volatile residue). Some propane and n-butane but no methane, ethane, ethylene, or propylene were found in the normally gaseous hydrocarbons. The $C_5^+$ paraffin yield of the reaction mixture, based on the weight of olefin charged, was 129.4% and the $C_5^+$ unsaturate yield was 4.3% on the same basis. Hereinafter all yield data are reported as based on the weight of olefin charged.

In gasoline of such low olefin content, the olefins can be removed from the gasoline by extraction, as with sulfuric acid or hydrofluoric acid, and the recovered olefin can be used as feed to the $Cr^{+3}$ Y zeolite.

EXAMPLE VIII

This example and Example IX show the effect of feed olefins other than butene-2 on the yield of $C_5^+$ products and their distribution. Example VIII was repeated, with a similarly prepared catalyst, except that the feed olefin was butene-1. The $C_5^+$ paraffin yield and the $C_5^+$ unsaturate yield were about the same as those obtained in Example VII with butene-2 and the distribution of $C_5^+$ paraffins and the $C_8$ distributions were similar to those obtained in Example VII with butene-2.

EXAMPLE IX

A similar run to Example VIII was made using 2-methylbutene-2 as the feed olefin and a catalyst, prepared in a manner similar to the catalyst of Example III, which analyzed 5.0% cerium, 1.19% sodium, and had a loss on ignition of 25.65%. The catalyst was activated (final temperature 400° F.) as in Example VI. The $C_5^+$ paraffin yield was 28.6% and the $C_5^+$ unsaturate yield was 31.2%, based on the weight of olefin charged. The molar ratio $C_8/C_9$ of the $C_5^+$ paraffins was 1.00.

A similar run with a somewhat more acidic catalyst produced a $C_5^+$ paraffin yield of 49.5% and 15.4% $C_5^+$ unsaturates based on the weight of olefin charged. Of the $C_5^+$ paraffins 29 mole percent were $C_9^+$ paraffins and 36.6 mole percent were $C_8$ paraffins (molar ratio $C_8/C_9$ was 1.25). The presence of $C_8$ paraffins indicates that self-alkylation of isobutane occurred during the reaction.

EXAMPLE X

This example illustrates use of a fixed bed of substantially anhydrous acidic zeolite to catalyze the liquid phase paraffin-olefin alkylation and also produce $C_5^+$ olefins. A bed of 20/60 mesh zeolite catalyst was set up in a vertical column. The catalyst used was an acidic Y zeolite containing 7.8% of mixed rare earth ions (from exchange with a crude didymium salt) of which 41% was lanthanum. The catalyst contained less than 0.4% of cerium, 1.6% sodium, and had an atomic ratio Al/Si of 0.44.

The catalyst bed was activated in situ and in a manner similar to the activation of Example VII. The catalyst was then pre-wet with isobutane. A feed containing 1 part by weight of butene-2 and 15 parts by weight of isobutane was passed once through the column at a weight hourly space velocity (WHSV) of 8.3 (WHSV of olefin=0.5), at 440 p.s.i.g. and 120° C., in a period of 80 minutes. The $C_{5+}$ naphthene yield was 0.6%, and the $C_{5+}$ unsaturate yield was 4.5%. Of the $C_{5+}$ paraffins, over 78% was pentanes, and 85% of these pentanes was n-pentane. The trimethylpentane to dimethylhexane ratio in the $C_8$ fraction was 1.58. Note that the maximum possible concentration of unreacted olefin in the reaction mixture is 6.1 mole percent.

A control reaction with the same catalyst and a similar activation in a stirred reactor, run similar to Example VIII, at 120° C. and 480–565 p.s.i.g. for 220 minutes produced 88.0% $C_{5+}$ paraffins and 6.9% $C_{5+}$ unsaturates. Of the $C_{5+}$ paraffins, less than 10% was pentanes and only 15% of these pentanes was n-pentane. The trimethylpentane to dimethylhexane weight ratio was 2.72 in the $C_8$ paraffin fraction.

EXAMPLE XI

This example illustrates the highly unsaturated products which can be obtained from a paraffin and olefin feed by the use of acidic Y zeolite catalyst under certain process conditions. In particular, the example shows a combination of an activated cerium-exchanged, ammonium-exchanged, sodium Y zeolite and process conditions analogous to those of U.S. Pat. 3,251,902.

A comparison of this example with the previous examples shows the great increase in $C_{5+}$ olefin caused by not controlling the addition of the olefin such that the amount of unreacted olefin in the reaction mixture is less than 12 mole percent (preferably less than 7 mole percent) based on the unreacted $C_4$ to $C_6$ isoparaffin. That is, olefin polymerization is favored when the feed to an acidic zeolite catalyst contains in the range of 12–100% $C_3$–$C_6$ olefin. If the feed paraffin or feed olefin or both are in vapor phase, polymerization is also favored over alkylation.

All of the products of this example can be used per se as feeds to a $Cr^{+3}$ Y (or other Group VI metal) zeolite at 650–1150° F., 1 to 20 atm., to produce a mixture of paraffins and aromatics.

A portion of an 8-cycle cerium-exchanged/8-cycle ammonium-exchanged-sodium Y zeolite (prepared similarly to that of Example III) was activated by the process of Example VI except that the mximum activation temperature was 650° C. 16.8 g. of the activated zeolite, which analyzed 1.7% Na (ignited) and Ce (ignited) were charged into a one-liter stirred autoclave, to which was added 6.1 moles of liquid isobutane. The temperature was raised to 80° C. and the pressure adjusted to 260 p.s.i.g. nitrogen, then 1.2 moles of liquid butene-2 was gradually charged to the reactor, with stirring, over a period of 2.2 hours. The total $C_{5+}$ hydrocarbon yield was 10.8% of the weight of olefin charged and contained 47.3% saturated and 52.7% unsaturated hydrocarbons. Note that in this procedure the maximum probable concentration of unreacted olefin in the reaction mixture is 16.4 mole percent.

When the above reaction was repeated with a 22.4 gram portion of the same zeolite which was similarly activated except that the maximum activation temperature was 500° C., the total $C_{5+}$ yield was 19.7% of the weight of olefin charged and was 47.5 volume percent saturated and 51.4 volume percent unsaturated.

With 17.0 grams of this activated zeolite and a reaction temperature of 40° C. (100 p.s.i.g.), the $C_{5+}$ yield, based on weight of olefin charged, was 4.6% and was 41 volume percent saturated and 59 volume percent unsaturated.

With 23.0 grams of the activated zeolite and a reaction temperature of 120° C. (450 p.s.i.g.), the $C_{5+}$ yield, was 45.2% based on the weight of olefin charged and was 61 volume percent saturated and 39 volume percent unsaturated.

The high degree of unsaturation in the products of this example indicates that a major reaction was olefin polymerization as in the general reaction

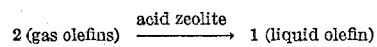

2 (gas olefins) $\xrightarrow{\text{acid zeolite}}$ 1 (liquid olefin)

To be usable as a high octane fuel, these liquid olefins require hydrogenation or other additional procressing, such as the following reaction of the present invention:

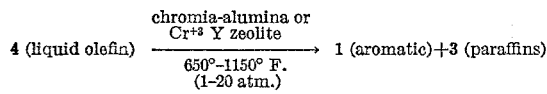

4 (liquid olefin) $\xrightarrow[\substack{650°-1150° \text{ F.} \\ (1-20 \text{ atm.})}]{\text{chromia-alumina or } Cr^{+3} \text{ Y zeolite}}$ 1 (aromatic)+3 (paraffins)

This highly aromatic product is a high octane gasoline blend component, particularly when the liquid olefin is formed from the polymerization of $C_4$ olefins or a mixture of $C_3$ and $C_5$ olefins. The $Cr^{+3}$ Y zeolite is preferably activated at a temperature in the range of 650–1400° F., with care being taken to insure retention of at least 10% of the crystallinity of the zeolite.

EXAMPLE XII

The 39% unsaturated product obtained at a reaction temperature of 120° C., in the previous example, is passed through a fixed bed of 500° C. activated $Cr^{+3}$ Y zeolite (prepared as in Example V) at a liquid hourly space velocity of about 1, an average bed temperature of about 700° F., (maximum about 725° F.) at a hydrogen to oil ratio of about 2. Initially, cracking is the predominant reaction; however, after an induction (or catalyst aging) period the degree of cracking lessens and analysis of the reaction product shows about 25% conversion per pass of feed olefin to aromatics and paraffins. Product recycle can be used to increase the degree of conversion and ultimately, produce a reaction mixture of sufficiently low olefin content so as to be useful as a gasoline blending component. The carbon number distribution of this reaction product also indicates that a considerable amount of cracking occurs; however, at least 90 weight percent of the product is in the gasoline boiling range (e.g. $C_4$–$C_{10}$). On a debutanized basis, the gasoline boiling range product has a calculated research octane of at least 95. With $Cr^+$ Y zeolite, the preferred conversion temperature in the subject process is in the range of 700–1000° F. (the primary factors in this choice are the method of catalyst preparation and the nature of the feed components). As the catalyst ages, cracking is reduced and the reaction temperature can be increased (probably, this reduced cracking is caused by aromatic compounds, on the catalyst and in the feed). With a suitably aged catalyst a preferred temperature range is 850–1150° F., at a hydrogen to hydrocarbon molar ratio in the range of 0.3.

Heretofor herein we have described means for obtaining normally liquid olefins from normally gaseous olefins (including means of obtaining hydrocarbonaceous feeds which are rich in such normally liquid olefins and which also contain paraffin hydrocarbons in the gasoline boiling range, particularly, major amounts of $C_8$ and high paraffins). For example, the processes of the aforementioned U.S. Pat. 2,278,677; 2,326,585; 3,132,186; 3,236,762 and 3,251,902 can be used to prepare feeds which are rich in liquid olefins.

A particularly preferred class of feeds consists essentially of normally liquid branched chain olefins and branched chain paraffins in the gasoline boiling range (that is, in such a preferred feed, there will be found few if any normal paraffins straight chain olefins or naphthenic hydrocarbons). Other feeds which are rich in normally liquid olefin hydrocarbons (including normally liquid branched chain olefins) and in $C_8$ and higher paraffins can be obtained by the processes reported herein.

In connection with the highly unsaturated products obtained by such procedures as Example XI (which product consists essentially of acyclic paraffin hydrocarbons in the gasoline boiling range and 39–59% of normally liquid acyclic olefins) it has been disclosed herein that such liquid olefins can be converted (as by contacting with chromia-alumina or $Cr^{+3}$ Y zeolite at 650°–1150° F. and 1–20 atmospheres) to a mixture of aromatic and paraffinic hydrocarbons. In particular, about one mole of aromatic hydrocarbons and 3 moles of paraffinic hydrocarbons can be obtained for each 4 moles of liquid olefin which are so converted.

In general, a process for converting normally liquid olefin to a mixture of aromatic and paraffinic hydrocarbons, useful as a gasoline blending component, comprises contacting the olefin with a solid catalyst comprising a Group VI metal or a compound of a Group VI metal (e.g., a sulfide or an oxide or a mixture of sulfide and oxide), at 650°–1150° F. and 1–200 atmospheres (which can be from 0 to 100% hydrogen, exclusive of the hydrocarbon partial pressure), whereby the normally liquid olefin is at least partially in vapor phase, for a contact time (or at a liquid hourly space velocity) sufficient to cause at least part of the normally liquid olefin to be converted to a mixture of aromatic and paraffinic hydrocarbons. With a conventional chromia-alumina catalyst, such as had heretofore been used for naphtha reforming, and typically containing 1–35% $Cr_2O_3$ (see U.S. Pat. No. 2,735,801 and No. 2,850,546) the catalytic contacting can be at a liquid hourly space velocity (LHSV) in the range of 0.1–10 (preferably, 0.25–2.5) based on the volume of olefin in the fresh feed. At the lower LHSV (e.g., 0.5) some dehydrocyclization of paraffins in the reaction mixture can occur, thus enabling the production of more than one mole of aromatic hydrocarbons for each 4 moles of olefin which is converted. Higher conversion temperatures (e.g., 850°–1050° F.) tend to favor such dehydrocyclization.

The present process for conversion of normally liquid olefins to aromatics and paraffins can be distinguished from naphtha reforming in that the preferred feeds to the present process contain less than 5% of naphthenes (typically, less than 1%) whereas the usual light and heavy naphtha fractions utilizes in catalytic reforming contain major quantities of naphthenes (e.g., 15–60%). Such naphtha fractions also contain, typically much higher percentages of normal paraffins than can be found in the preferred feeds (containing normally liquid branched chain olefins) which have heretofore been described herein.

However, it is within the scope of the present invention to utilize feed stocks containing a high concentration of n-paraffins or of n-olefins. For example, in our aforementioned copending applications Ser. Nos. 823,656 and 34,209, now U.S. Pat. No. 3,666,072, we disclose a means of converting n-paraffin in conjunction with the liquid phase alkylation of olefins and paraffins (e.g., butene and isobutane). Reaction mixtures obtained from such as n-paraffin conversion process, and which contain unconverted n-paraffin, can be utilized as feed stocks, or as components of feed stocks (as in conjunction with additional normally liquid olefin components) in the conversion of normally liquid olefins to a mixture of aromatic and paraffinic hydrocarbons, useful as a component for gasoline blending.

Such a conversion of normally liquid olefins to aromatics and paraffins, in the presence of a solid catalyst containing a Group VI metal or compound of a Group VI metal, can be conducted at hydrogen partial pressures ranging from autogenous at a given space velocity and temperature, to hydrogen pressures as high as about 200 atmospheres (however, we prefer to operate at total pressures in the range of 1–80 (more preferably, 1–20) atmospheres, due to the high cost of high pressure reactor vessels). Carbon dioxide can also be present in the reactor as in U.S. Pat. No. 2,775,631.

The preferred solid Group VI metal or metal compound catalysts for the conversion of normally liquid olefins to a mixture of aromatic and paraffinic hydrocarbons are on a support such as the aluminas, the silicas and the alumino-silicates. For example, such a supported catalyst can comprise a Group VI metal oxide supported on a zinc-zirconium-aluminate spinel (see U.S. Pat. No. 2,846,365) or can comprise coprecipitated oxides (see U.S. Pat. No. 2,775,631). The support material can be amorphous, micro-crystalline or crystalline by X-ray analysis, or can be a combination of two or more such phases. For example, a preferred catalyst combination comprises a substantially anhydrous acidic alumino-silicate zeolite which is from 10–100% crystalline by X-ray the crystalline portion of which corresponds to a type Y zeolite, and which contains at least one trivalent or divalent metal, metal oxide, metal hydroxide or metal sulfide for every 12 atoms of aluminum in the alumino-silicate zeolite. Further preferred are crystalline zeolites of the faujasite and mordenite cage structure.

Preferably, the metal portion of said cation comprises at least one metal from Group VI (e.g., Cr, Mo and W). The Group VI metal catalyst can be combined with a support, such as an alumino-silicate, by any of the usual means, including ion exchange, coprecipitation, impregnation or physical admixture of the support with a finely divided Group VI metal or with a pulverized compound of a Group VI metal with the support material. The oxide form of the catalyst can be partially or wholly sulfided as with $H_2S$ or $CS_2$, if the sulfide form of the Group VI metal is to be used as a contact catalyst. Preferably the catalyst is substantially free from chloride (typically, less chloride than would be present if 2% of the adsorptive capacity of the zeolite were occupied by HCl).

The invention claimed is:

1. Process for converting normally liquid olefin having at least 5 carbon atoms to a mixture of aromatic and paraffinic hydrocarbons, useful as a gasoline blending component, said process comprising contacting a feed stock containing said normally liquid olefin including normally liquid branched olefin, with a solid substantially chloride-free crystalline alumino-silicate zeolite catalyst comprising chromium or a compound of chromium, at a temperature in the range of 650°–1150° F. and a pressure in the range of 1 to 20 atmospheres, whereby said normally liquid olefin is at least partially in vapor phase, for a time to cause at least part of said normally liquid olefin to be converted to a mixture of aromatic and paraffinic hydrocarbons, and wherein the atomic ratio Al/Si in said zeolite is less than 0.65.

2. Process according to claim 1 wherein said catalyst comprises a compound of chromium and said zeolite is at least 10% crystalline by X-ray analysis and said feed stock and said catalyst are substantially chloride-free.

3. Process according to claim 2 wherein the crystalline portion of said catalyst has an Al/Si ratio in the range of 0.65–0.35.

4. Process according to claim 3 wherein said catalyst comprises $Cr^{+3}$ Y zeolite.

5. Process according to claim 4 wherein said normally liquid olefin is converted into a mixture of about one mole of aromatic hydrocarbons and about 3 moles of paraffinic hydrocarbons for each 4 moles of said olefin converted.

6. Process according to claim 1 wherein upon ignition analysis at 1000° F. said catalyst evolves from 1–4 molecules of water for each atom of Group VI metal present in exchanged form in said catalyst.

7. Process according to claim 1 wherein said temperature is in the range of 700–1000° F.

8. Process according to claim 1 wherein said solid catalyst comprises additionally one or more members selected from the group consisting of molybdenum or tungsten or a sulfide or oxide thereof.

9. Process according to claim 1 wherein said normally liquid olefin consists essentially of $C_5$–$C_{10}$ monoolefin and has been obtained by contacting $C_2$–$C_6$ olefins with an alumino-silicate zeolite catalyst.

10. Process according to claim 1 wherein said normally liquid olefin has been obtained by contacting at least one $C_2$–$C_6$ olefin in admixture with at least one $C_3$–$C_9$ paraffin in the presence of a substantially anhydrous, acidic crystalline alumino-silicate zeolite catalyst.

11. Process according to claim 10 wherein said olefin comprises $C_8$ and higher branched olefin which has been obtained by polymerization of $C_4$ olefins or by polymerization of a mixture comprising $C_3$ and $C_5$ olefins.

12. Process for converting normally liquid olefin to a mixture of aromatic and paraffinic hydrocarbons, useful as a gasoline blending component, said process comprising contacting said normally liquid olefin with a solid catalyst comprising a combination of a crystalline substantially chloride-free alumino-silicate zeolite and chromium or a compound of chromium, at a temperature in the range of 650°–1150° F. and a pressure in the range of 1 to 80 atmospheres, whereby said normally liquid olefin is at least partially in vapor phase, for a time to cause at least part of said normally liquid olefin to be converted to a mixture of aromatic and paraffinic hydrocarbons and wherein said zeolite has an Al/Si atomic ratio in the range of 0.65–0.2.

13. Process according to claim 12 wherein said catalyst comprises chloride-free $Cr^{+3}$ Y zeolite.

14. Process for converting $C_2$–$C_6$ monoolefin into a mixture of aromatic and paraffinic hydrocarbons in the gasoline boiling range, which mixture is useful as a high research octane rating component for gasoline blending, said process comprising
   (a) contacting $C_2$–$C_6$ monoolefin with an acidic alumino-silicate zeolite catalyst at a temperature in the range of 0–400° F. at conversion conditions which produce olefin polymerization, and obtaining a product containing at least one $C_7$–$C_{12}$ olefin, and
   (b) contacting said $C_7$–$C_{12}$ olefin product with a solid crystalline alumino-silicate zeolite catalyst containing a Group VI metal or a compound of a Group VI metal, at a temperature in the range of 850–1150° F. and a pressure in the range of 1–20 atmospheres, for a time sufficient to cause at least partial conversion of said $C_7$–$C_{12}$ olefin to said mixture of aromatic and paraffinic hydrocarbons.

15. The process of claim 14 wherein said catalyst contains chromium or a compound of chromium.

16. The process of claim 15 wherein said catalyst is $Cr^{+3}$ Y zeolite.

References Cited

UNITED STATES PATENTS

| | | | |
|---|---|---|---|
| Re. 26,188 | 4/1967 | Kimberlin, Jr., et al. | 208—120 |
| 2,992,283 | 7/1961 | Eng | 260—673 |
| 2,971,903 | 2/1961 | Kimberlin et al. | 208—119 |
| 3,236,910 | 2/1966 | Bukata et al. | 260—683.3 |
| 2,378,057 | 1/1945 | Yarnall | 260—673 |
| 3,364,135 | 1/1968 | Hansford | 208—120 |
| 2,404,628 | 7/1946 | Grenko et al. | 260—673 |
| 3,448,037 | 6/1969 | Bunn, Jr., et al. | 208—Dig. 002 |
| 3,644,200 | 2/1972 | Young | 260—673.5 |

DELBERT E. GANTZ, Primary Examiner

J. M. NELSON, Assistant Examiner

U.S. Cl. X.R.

208—136; 260—673, 680 R